United States Patent
Sharifi Mehr et al.

(10) Patent No.: US 10,104,185 B1
(45) Date of Patent: Oct. 16, 2018

(54) POLICY-BASED CONTAINER COTENANCY

(71) Applicant: AMAZON TECHNOLOGIES, INC., Seattle, WA (US)

(72) Inventors: Nima Sharifi Mehr, Vancouver (CA); Scott Gerard Carmack, Mercer Island, WA (US); Narasimha Rao Lakkakula, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 14/822,453

(22) Filed: Aug. 10, 2015

(51) Int. Cl.
| | | |
|---|---|---|
| *H04L 29/08* | (2006.01) | |
| *H04L 12/24* | (2006.01) | |
| *H04L 29/06* | (2006.01) | |
| *G06F 9/54* | (2006.01) | |
| *G06F 9/455* | (2018.01) | |
| *G06F 9/48* | (2006.01) | |

(52) U.S. Cl.
CPC .......... *H04L 67/16* (2013.01); *H04L 41/5054* (2013.01); *H04L 63/0245* (2013.01); *H04L 63/105* (2013.01); *H04L 67/1095* (2013.01); *G06F 9/4555* (2013.01); *G06F 9/4843* (2013.01); *G06F 9/54* (2013.01)

(58) Field of Classification Search
CPC ............. G06F 17/30289; G06F 17/211; G06F 17/243; G06F 17/50; G06F 21/629; G06F 3/0605; G06F 11/1458; H04L 63/205; H04L 63/20
See application file for complete search history.

(56) References Cited

U.S. PATENT DOCUMENTS

| | | | |
|---|---|---|---|
| 2005/0094207 A1* | 5/2005 | Lo | G06F 17/243 358/1.18 |
| 2007/0233709 A1* | 10/2007 | Abnous | G06F 17/30607 |
| 2011/0252359 A1* | 10/2011 | England | G06F 9/4443 715/781 |
| 2012/0210333 A1* | 8/2012 | Potter | G06F 9/4843 719/313 |
| 2014/0189777 A1* | 7/2014 | Viswanathan | H04L 63/105 726/1 |
| 2015/0150003 A1* | 5/2015 | Emelyanov | G06F 9/455 718/1 |
| 2016/0266917 A1* | 9/2016 | Emelyanov | G06F 9/4555 |
| 2016/0342401 A1* | 11/2016 | Keis | G06F 8/61 |
| 2016/0378518 A1* | 12/2016 | Antony | G06F 9/45533 718/1 |
| 2016/0380909 A1* | 12/2016 | Antony | H04L 47/722 370/236 |
| 2017/0052807 A1* | 2/2017 | Kristiansson | G06F 9/54 |
| 2017/0353433 A1* | 12/2017 | Antony | H04L 63/0245 |

* cited by examiner

*Primary Examiner* — Barbara N Burgess
(74) *Attorney, Agent, or Firm* — Blank Rome LLP

(57) ABSTRACT

A non-transitory computer-readable storage device stores instructions that, when executed on a computing system, cause the computing system to receive a request for creating a new software container and determine that characteristics of the new software container match a co-tenant policy of an existing software container on a server. The instructions further cause the computing system to determine that characteristics of the existing software container match a co-tenant policy of the new software container as well as cause the new software container to be created on the server.

21 Claims, 12 Drawing Sheets

POLICY-BASED CONTAINER COTENANCY

BACKGROUND

As an increasing number of applications and services are being made available over networks such as the Internet, an increasing number of service providers are turning to technologies such as cloud computing. In general, cloud computing is an approach to providing access to remote resources through a network. Such resources may include hardware and/or software. Hardware resources may include computers (e.g., servers), mass storage devices, and other useful hardware elements. Software resources may include operating systems, databases, etc. Customers of the service provider can use the service provider's network to have various resources allocated for exclusive use by the customers. The customer then may pay for use of the service provider's resources rather than owning and operating his or her own hardware and software resources. The customer's applications may then run within the environment of the service provider's resources allocated for use by the customer.

For efficiency, cost, performance and other reasons, applications and data by multiple unrelated customers may run on, and be accessible to, the same set of physical servers. Any number of disparate customers may be assigned by the service provider to the same physical hardware, and in many cases without any control by the customers.

BRIEF DESCRIPTION OF THE DRAWINGS

For a detailed description of various examples, reference will now be made to the accompanying drawings in which.

DETAILED DESCRIPTION

Figure 1:
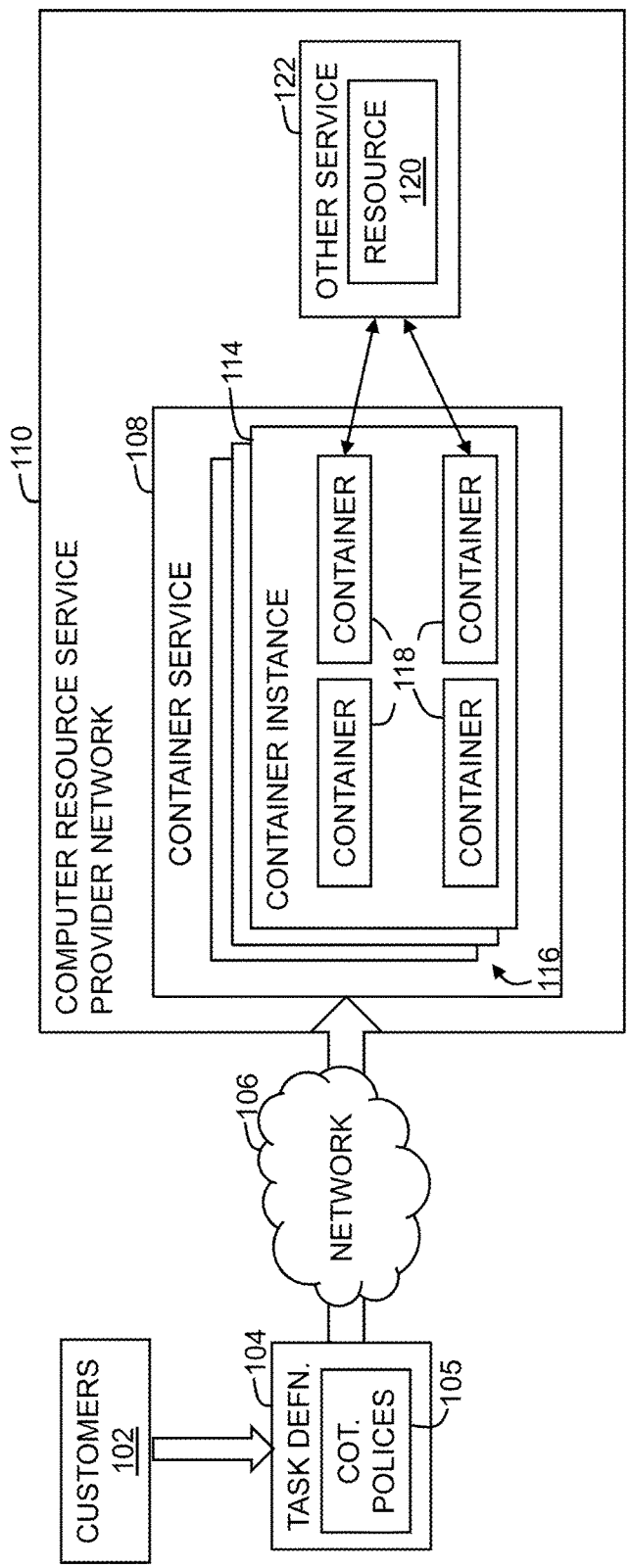
FIG. 1 shows an example of a customer interacting with a container service in accordance with an embodiment.

This disclosure is related to software containers and the creation of software containers within container instances on a service provider network. Per the embodiments described herein, each customer of a service provider of computing resources is given control over the placement by the service provider's container system of other customer' software containers in the same container instance, in the same cluster of container instance, and/or on the same physical server as that customer's own container instance(s). Some customers may not care whether their software containers are launched in the same container instance (or container instance cluster or physical server) as other customers' container instances. Other customers may not want any other customer's software containers in their container instances (or cluster or physical server), and instead prefer to have a dedicated container instance host the customer's software containers. However, some customers may be tolerant of other customers' software containers located in their container instance, cluster of container instances, or physical server, but they would like to have some degree of control over which software containers the service provider places in their container instance, cluster, or physical server.

Through web and other types of user interfaces, customers of a service provider of hardware and software resources are able to create and manage software containers for use by the customer and other entities to which the customer wants to give access (e.g., clients of the customer). Through such interfaces, each customer also is able to specify a cotenant policy. A cotenant policy includes one or more requirements with which the service provider must abide when deciding where to place new software containers (e.g., on which container instance, in which cluster of container instances and/or on which virtual machine or physical server to launch such containers). For example, a customer can create a cotenant policy that dictates that only software containers that meet certain minimum requirements can be placed on the same physical server or the same container instance as the customer's own software container(s). Cotenant policies can specify a wide variety of cotenant requirements such as software container image type, security level, etc. For example, a cotenant policy can specify that only software containers created pursuant to a particular software image and that employ multifactor authentication for accessing the container can be created in the same container instance as the customer that created the cotenant policy. Software images used to create containers are described below.

Further, the cotenant policy can specify whether such restrictions apply to container instances of the customer, to clusters of container instances of the customer, to a virtual machine instance on which the customer's container instance is implemented, or to the physical servers on which the customer's containers run. That is, the cotenant polices described herein can apply to cotenancy at the container instance level, the container instance cluster level, the virtual machine level, and/or the physical server level. For example, Customer A can limit other customer containers being placed in the same container instance as Customer A. Customer A can also limit other customer containers being in the same cluster of containers instances in which Customer A has a container. A cotenant policy can also permit Customer A to limit other customer containers being launched on the same physical server or virtual machine instance as Customer A has a container. The examples below describe cotenant policies that permit the policy owner to control container service to launch containers of that customer or different customers in the same container instance as the container for which the policy was created. By extension, the cotenant policies described herein also can be created and used to control launching containers into clusters of containers, physical servers or virtual machine instances which run the container to which the policy was created.

In some embodiments, a separate cotenant policy may have been created for each software container that is launched in a container instance by the respective owners of the containers. Such software containers are only launched in the same container instance if doing so complies with all applicable cotenant policies. Multiple software containers may be launched in the same container instance if such placement is deemed initially to result in compliance with all of the corresponding cotenant policies. Subsequently, the system periodically or on demand reassesses whether each cotenant policy remains in compliance. If a cotenant policy is no longer in compliance, the system will select a cotenant from the container instance for migration to another container instance in the same or different physical server in response to the cotenant policy violation condition.

In some embodiments, a customer can create a cotenant policy to include any one or more of a variety of cotenant restrictions such as those mentioned above and provided in more detail below. Additionally or alternatively, a customer can specify a "trust score" in its cotenant policy. The system may compute a trust score for each software container before it is launched in a container instance. The trust score generally indicates the level of trustworthiness of the software container. For example, a particular software container that requires multifactor authentication for access to the container and its application(s), that has a firewall, and that has a high traffic load may be deemed more trustworthy than a software container that requires no user authentication (or least not multifactor authentication), has no firewall and has very little traffic load. The trust score for the former software container will be higher than for the latter. A customer can be specify in its cotenant policy that only software containers with a certain minimum trust score can be placed in the same container instance as the customer's own software containers.

This disclosure thus relates to a customer being able to control the service provider's ability to locate other software containers in the same container instance as the customer's own software containers. The terms "tenant" and "cotenant" are used below. A tenant is generally synonymous with a software container that is launched in a container instance. Cotenants refer to two or more tenants that are launched in the same container instance. Cotenants may include software containers of the same customer (e.g., containers managed under the same customer account) and/or may include software containers of different customers. Reference to a "new" tenant refers to a software container that has not yet been created but will be. In some cases, a "new" tenant may simply distinguish a more recently created software container from a previously created container.

A software container (or simply "container") may be a lightweight virtualization instance running under a computer system instance that includes programs, data, and system libraries. When the container is run, the running program (i.e., the process) is isolated from other processes running the same container instance. Thus, each container may run on an containerable operating system (e.g., using memory, CPU, and storage allocated by the operating system) an operating system of the container instance and execute in isolation from each other. For example, each container may have an isolated view of the file system of the operating system. A container instance may refer to a computer system instance (virtual or non-virtual, such as a physical computer system running an operating system) that is configured to launch and run software containers. Thus, containers run in container instances. Each of the containers may have its own namespace, and applications running within the containers are isolated by only having access to resources available within the container namespace. Thus, containers may be an effective way to run one or more applications within their own namespace. A container encapsulation system allows one or more containers to run within a single container instance without the overhead that otherwise would be required with starting and maintaining virtual machines for running separate user space instances. An example container encapsulation system is the Docker container engine.

The containers may be launched to have only specified resources from resources allocated to the container instance. That is, a container may be launched to have a certain amount of memory and to not utilize more than a specified amount of processing power. The resource allocation for each container may be specified in a task definition file. The owner of a container may generate or cause to be generated the task definition file. Multiple containers may run simultaneously on a single host computer or host container instance, and the resources of the host can be allocated efficiently between the containers. In some embodiments, a single host may allow multiple customers to have container instances running on the host. A container service may provide security to ensure that the customers are unable to access containers or clusters of container instances of other customers. Further, a customer is able to provide a cotenant policy to specify restrictions as to other customers' containers to be launched in the same container instance as that customer. In some embodiments, the cotenant policy may be included in the task definition file. If clusters of container instances are enabled (with each instance hosting multiple containers), the cotenant policy may limit containers that are launched into a specific container instance or may limit containers that are launched in any instance of the cluster.

FIG. 1 illustrates an en example of at least a portion of a computer resource service provider network 110. The service provider network 110 is provided by a service provider for use by customers 102 to have the customers' applications and data hosted on the service provider network 100. The computer resource service provider network 110 includes a container service 108 as shown, and may include other resources as well. One or more container instances 114 are provided by the container service 108 and multiple container instances 114 may be associated with each other to form a cluster 116 of container instances. The container instances 114 and the cluster 116 may run on a physical server and may run on a virtual machine running on a physical server. Customers can create and manage container instances, can create and manage clusters of container instances and can create containers within each container instance of a given cluster. A cluster may refer to one or more container instances 114 that have been registered to (e.g., as being associated with) the cluster. One or more software containers 118 may be launched and run in each container instance 114 on behalf of the customers 102. The container instances 114 within each cluster 116 may be of different instance types or of the same instance type, and each customer 102 may have more than one cluster 116. The customer 102 may launch one or more clusters and then manage user and application isolation of the containers 118 within each cluster through application programming interface calls.

In the example of FIG. 1, a customer 102 sends a task definition file 104 for software containers 118 along with a request to launch tasks through a network 106 to the container service 108 of the service provider's network 110. The customer 102 may include a cotenant policy 105 in the task definition file 104. A scheduler (e.g., scheduler 128 shown in FIG. 2) may determine into which cluster 116 and into which container instance 114 of a cluster 116 of container instances 114 that the software containers 118 specified in the task definition file 104 should be launched, or may create the container instances and clusters as specified in the task definition file. The decision by the container service 108 as to where to launch the container 118 (e.g., on which physical server, on which virtual machine, in which cluster 116, and/or in which container instance 114) is influenced by the cotenant policy 105, if any, included within the task definition file 104 as well as the cotenant policies of existing containers 118 (i.e., containers already running in the container instances 114).

In some embodiments, the software containers 118 may be configured to share resources 120 provided by other services 122 of the computer resource service provide network 110, such as a storage volume provided by a block-level data storage service of the computer resource service provide network. The customer 102 may be an individual associated with a customer account of the container service, or may be an individual, system, resource computing device, or other entity authorized to act on behalf of the individual associated with the customer account. Furthermore, the resources of the customer 102 may be made available to other users. For example, the customer 102 may utilize the container instance 114 to provide an online marketplace for other users, and such other users then may buy and/or sell goods and service through the online marketplace provided by the customer 102 through the container service. The customer 102 may communicate with the container service 108 of the computer resource service provider 110 through the network 106, which may be a communication network, such as the Internet, an intranet, an internet service provider (ISP) network or another type of network.

In some examples, the task definition file includes a file that specifies, for example, a set of linked containers 118 (i.e., a set of containers that, when running on a host computing system, are associated with each other) that are assigned to start as a group. The task definition file further may specify disk and network locations that the containers 118 are able to share on a single physical machine. The container instances 114 may be configured to run the containers 118 in accordance with the task definition file 104 provided by customers 102. The task definition file 104 that creates a particular software container also may specify, as a cotenant policy, the characteristics of other containers that the particular software container can be co-located with on a common container instance 114. Examples of the types of characteristics that a customer 102 can include in the cotenant policy 105 in the task definition file 104 are provided below. The task definition file 104 then may be utilized for launching the containers 118 specified in the file. In some implementations, the task definition file 104 may define and link containers 118 spread across multiple physical machines. One task definition file 104 may contain and schedule multiple tasks and more than one software containers 118.

The task definition file 104 may contain all of the information needed to place containers 118 in a cluster 116, and the cluster 116 may be managed through application programming interface calls. A task definition may refer to a script or set of metadata that may define a group of containers 118 (e.g., the number of containers, their types, their components, their relationships to other containers, information describing associated instances, and other metadata). Task definitions may also specify that groups of containers to be launched in coordination. Task definition files may also contain the cotenant policies described herein. The following is an example of a task definition that defines various tasks and provides a cotenant policy. The cotenant policy is associated with the containers that are created to run the specified tasks.

```
{  'db':
   {
      'Image': 'forest/postgresql',
      'Ports' : ['5432'],
      'CPU' : 1000,
      'Memory' : 1073741824
   },
   'web' :
   {
      'Image' : 'hub.web.com/rails:latest',
      'Ports' : ['8000:8000],
      'links' : ['db'],
         'CPU' ; 1000,
         'Memory' : 1073741824
   }
   {
   'Cotenant policy' :
         'Security' : 'multifactor authentication',
         'Account ID' : ['15236'-'15300'],
   }
}
```

The example task definition above specifies that a first task, entitled "db," has a software image located at the path "forest/postgresql." The first task is allocated processing shares of 1000 and 1 gigabyte of memory, and the first task uses port 5432. Similar, the task definition also specifies that a second task, entitled "web," has a software image located at the path "hub.web.com/rails:latest." The second task is allocated processing shares of 1000 and 1 gigabyte of memory, and the second task uses ports 8000:8000. The task definition also specifies that the second task ("web") is allowed to link to the first task ("db").

Further, the task definition specifies a cotenant policy which specifies multiple characteristics. In the illustrative cotenant policy, two characteristics are specified that must be met for the tasks (and their software containers) specified in the task definition file to be launched in the same container instance 114 as other containers. First, cotenant containers must employ multifactor authentication for access to such containers. Second, cotenant containers must have account identifiers within the range of 15236 to 15300. A customer has one or more account identifiers and containers created by a particular customer maintain the association of the account identifier. In the example above, a customer may specify that only that customer's containers (as identified by the various account identifiers associated with that particular customer) that employ multifactor authentication can be co-located in the same physical server, virtual machine, container instance, or cluster as the containers defined by the corresponding task definition file.

In various embodiments, each customer may maintain a "white list" of account identifiers that the customer is willing to tolerate being co-located by the container service 108. In some embodiments, each customer account may be "white-listed" by the service provider (e.g., based on being a large customer, never having experienced a security breach, manually, etc.) and only those accounts that are white-listed are eligible for co-location by the container service 108. The individual containers of customers may be similarly white-listed, and only those accounts that are white-listed are eligible for co-location.

In some embodiments, the cotenant policy can also specify the cotenancy level to which the policy is to apply. For example, the cotenant policy can specify that the characteristics listed in the policy apply to restrict the launching of containers in the same physical server that hosts the container to which the policy applies. Similarly, the cotenant policy can specify that the characteristics listed in the policy apply to restrict the launching of containers in the same virtual machine, container instance, or cluster that hosts the container to which the policy applies.

Table I below provides examples of various characteristics that a customer can specify for a cotenant policy. Additional or different restrictions can be used as well. Some of these characteristics may be included in the task definition file for the container, while other characteristics are specified by the customer through other means such as by configuring the containers following their creation.

TABLE I

Cotenant Policy Restrictions

| Restriction | Description |
| --- | --- |
| Account Identifier | Identifier of a service provider account |
| Container image type | Type of software image used to create a container |
| Container image version | To the extent that a given type of container software image has multiple versions, a customer can specify the version |
| Container image patch level | The patch identifier for an existing container software image - the patch includes updates to the container software image |

TABLE I-continued

Cotenant Policy Restrictions

| Restriction | Description |
| --- | --- |
| Digitally signed container software image | Customer can specify that a container software image must be digitally signed and/or that the container software image is digitally signed by a certain customer-specified signature authority |
| Security Level | Any type of security restriction. Examples include single factor or multifactor authentication and/or the use of a firewall or antivirus software |
| Cotenant Size | Customer specifies a minimum or maximum size of a cotenant in terms of business revenue, data traffic rate, etc. |
| Geographic Location | Customer may not want a cotenant whose business entity originates in certain customer-specified areas of the world |
| Operational history of container | Customer may not want to be co-located with a container that, either now or previously, operated a certain way (e.g., had access to the Internet, operated at some point in time without encryption, etc.) |

Account identifiers may permit a customer of the service provider to be co-located with other customers with which they have a business relationship. For example, if customer A is a seller of products and customer B is a supplier of parts to customer A, customer B may include customer A's customer identifier to force co-location in the same instance as customer A for performance benefit reasons (i.e., less latency, faster processing of transactions between customers A and B, etc.). Other mechanisms besides customer identifiers may be implemented to provide container placement decisions based on the business or pricing policies of the service provider's customers. In another example, a sought after service of customer F could provide a free application programming interface (API), but charge for faster processing through co-location on the same hardware. That is customer G may have free access to customer F's API, but have the option of paying for faster processing by customer F if customer G's container is co-located on the same container instance (or virtual machine instance or physical hardware) as customer F. Customer G may institute a cotenant policy to force colocation with customer F.

Figure 2:
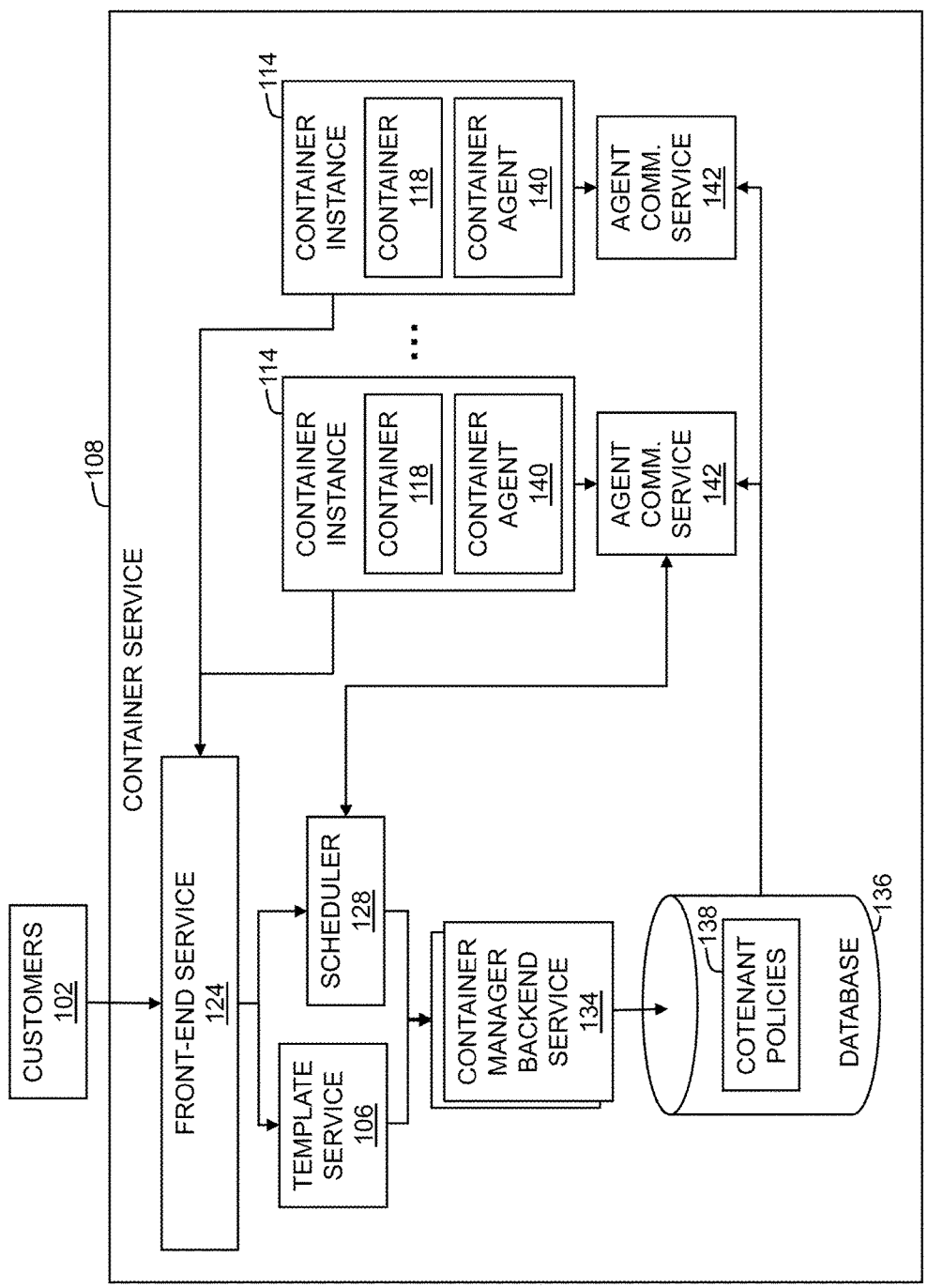
FIG. 2 shows a service provider network in which multiple software containers are launched into multiple container instances taking into account co-tenant policies specified by customers in accordance with an embodiment.

FIG. 2 illustrates an example of container service 108. As illustrated in FIG. 2, customers 102 of the computer resource service provider network 110 communicate through a front-end service 124 to create and manage one or more containers 118 within one or more container instances 114. The running processes and resources within a container may be isolated from other processes of the parent container instance and from the running processes and resources within other containers of the same host system. The customer may specify the amount of memory and processing capacity allocated to the container. The base container and the applications and data within it may be packaged as an image, including one or more programs, data, and any system dependencies (e.g., libraries, files, etc.) that are needed for the programs to run on the operating system of the container instance. In some examples, an "image" may refer to an entire copy of a particular state of the base container at the time the image was generated. The image thereafter may be used to launch one or more identical containers, each of which may be assigned the specified amount of resources and may be isolated from each other. The containers, based on a given image, may be launched on the same or different physical machines and each container may be expected to run in exactly the same way as the base container. The cotenant policies described herein influence where the containers are launched.

Each container instance 114 may be configured to contain a container agent 140 that allows the containers 118 in that instance to be managed. The container agents 140 can monitor the operation of the containers 118 and report operational status information pertaining to the containers (e.g., whether a container is running, experiencing an error, etc.). The container service 108 may include various services such as a template service 126 and a scheduler 128. Because the container service 108 may be configured as a multitenant service and because the services provided by the container service 108 exist outside and separate from the container instances 114, the customers need not install individual software applications within their respective instances 114 to provide the functionality afforded by such services. The customers 102 may utilize the functionality provided by these services by making web service application programming interface function calls through the front-end service 124, which may be configured to receive requests from the customers 102 and forward the requests to the appropriate service, such as container manger backend services 134, which function as described below.

As noted, a customer may launch one or more clusters and then manage user and application isolation within each cluster through the front-end service 124. For example, the customer may specify that container instances 1-10 should comprise a first cluster and container instances 11-15 should comprise a second cluster. Thereafter, when the customer submits a launch request for a container, the customer may specify whether the container should be launched in the first cluster or the second cluster. The customer can also include a cotenant policy with the launch request if the customer wants to exert control over which other containers are launched by the container service 108 in the same container instance 114. The launch request may be in the form of a task definition file.

The template service 126 may be configured to allow the customers 102 to define a task definition and cotenant policy for their containers. The template service 126 may receive task definitions from the customers 102, store the task definitions in the database 136, and allow the customers 102 to create, view, update, delete, and otherwise manage their task definitions. The template service 126 also may store any cotenant policies received by way of a task definition file, or otherwise, in the database 136 as cotenant policies 138. In such embodiments, the front-end service 124 or the container manager backend service 134 may parse the task definition file to separate out the cotenant policies of the corresponding container and store the cotenant policies separately in the database 136. In some embodiments, the entire task definition file may be stored intact in the database 136. In either case, the cotenant polices subsequently may be retrieved and evaluated by scheduler 128 when determining where to launch each new container.

The container manger backend services 134 may be configured to receive task definitions from the template service 126, store the task definitions in the database 136, receive container metadata from the container instances 118 or the agent communication service 142, and provide task definition information from the database 136 (including the cotenant policies 138) and the metadata from the containers to the scheduler 128.

The scheduler 128 launches, or causes to be launched, new containers 118 in the various container instances 114 in accordance with, among other factors, the various cotenant policies created by the customers 102. As will be explained below with regard to FIGS. 4-10, the scheduler 128 determines whether a cotenant policy of a new container to be launched in a container instance 114 will be in compliance once launched on that instance and, if any containers are already running on that instance and have cotenant polices themselves, that launching the new container on the instance will not violate the cotenant policy of an existing container.

Figure 3:
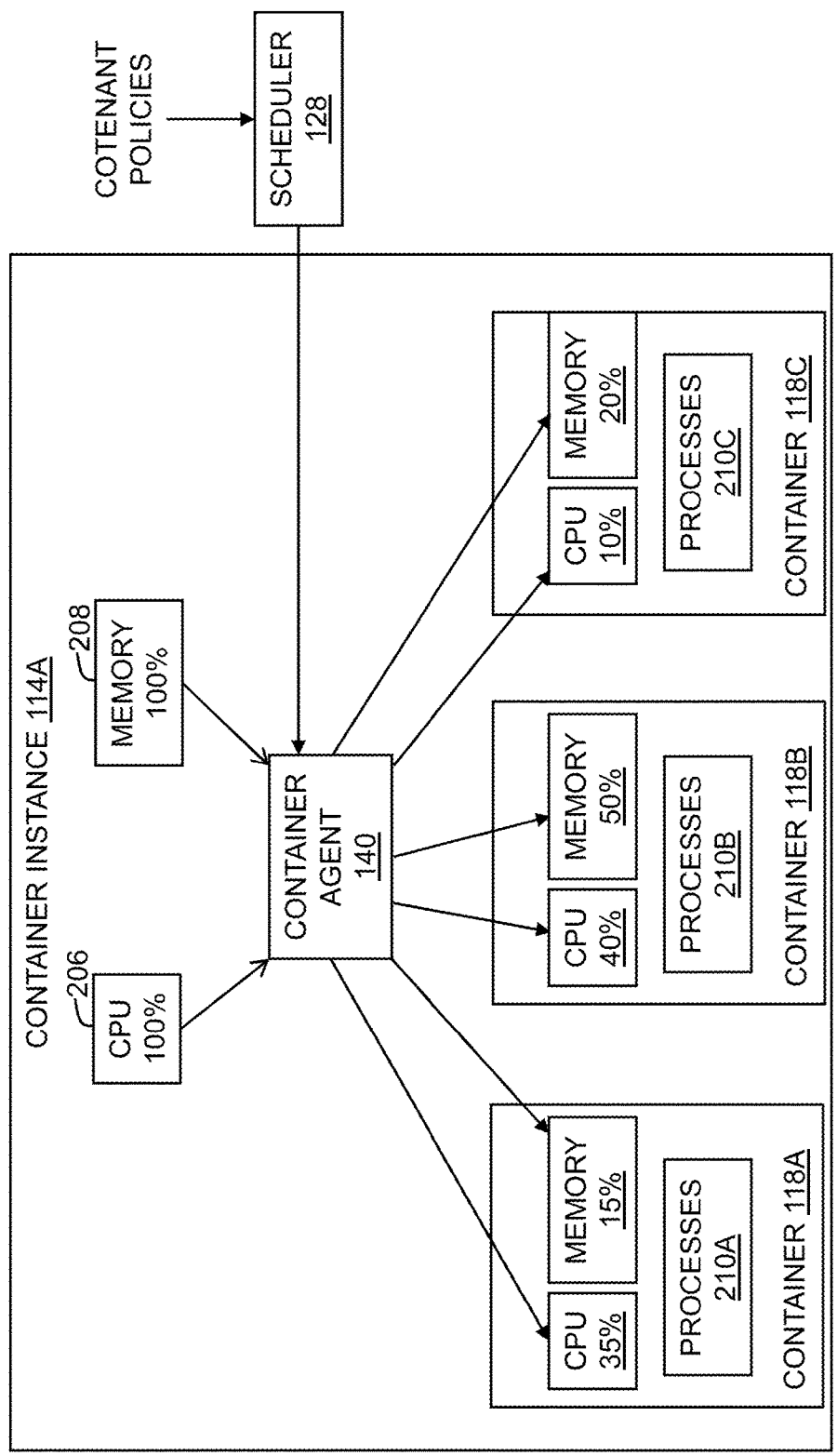
FIG. 3 shows a container instance in accordance with an embodiment.

FIG. 3 illustrates an example of the scheduler 128 causing the container agent 140 to launch three containers 118A 118B, and 118C in container instance 114A in accordance with the cotenant policy provided to the scheduler 128 for each such container. That is, for each of the three containers 118A-118C to be launched, each container's cotenant policy, if any, must be evaluated and determined to be in compliance. If the policy will be in compliance, the container is permitted to be launched on instance 114A, and if the policy will not be in compliance, that container will not be permitted to launch on instance 114A. Instead the scheduler 128 will search for another suitable container instance in which to launch the new container.

In some embodiments, the scheduler 128 may override or ignore a cotenant policy. That is, a cotenant policy for a new container to be created may require customers of existing containers in a container instance in which the new container is to be placed to be of a certain size (e.g., have more than 10,000 employees, more than a threshold amount of revenue, etc.). For security reasons, the scheduler 128 may be configured to disallow placement of a new container in the same container instance (or same virtual machine, etc.) as a container of a large customer. As such, the scheduler 128 may ignore a cotenant policy of a small customer (e.g., a non-business individual) whose cotenant policy requires cotenancy with a larger customer. Instead, the scheduler 128 may place the small tenant in its own container instance. Thus, in some embodiments, the scheduler 128 determines whether launching a software container would violate a security parameter despite a cotenant policy. The security parameter encoded into the scheduler may be, for example, that for large customers (e.g., more than 10,000 employees, etc.), no customer smaller than a threshold level (individuals, companies with less than 100 employees, etc.) may have their containers located in the same container instance as the large customer. Other security parameters are permitted as well. As a result, if a small customer's cotenant policy specifically requests co-location with a large customer, the scheduler 128 may override that request. Thus, in such an example, for no violation of the cotenant policy but a positive determination that the software container would violate the security parameter, the scheduler 128 may launch the software container in its own container instance.

FIG. 3 also illustrates resource allocation within the container instance 114A and containers 118A, 118B, and 118C. The container instance 114A is depicted with an allocated amount of processing resources 206 (e.g., CPUs) and an amount of memory resource 208. Each of the containers 118A-118C may be launched within the container instance 114A from a software image and allocated an amount of resources from the pool of resources of the container instance 114A, such as processing resources 206 and memory resources 208. As shown, container 118A has been allocated 35% of the processing resources 206 and 15% of the memory resources 208 of the container instance 114A in order to run its processes 210A. Similarly, container 118B has been allocated 40% of the processing resources 206 and 50% of the memory resources 508 of the container instance 114A in order to run its processes 210B. Likewise, the container 118C has been allocated 10% of the processing resources 206 and 20% of the memory resources 208 of the container instance 114A in order to run its processes 210C. In sum, 85% of the processing resources and 85% of the memory resources of the container instance 114A have been allocated to the containers 118A-118C.

FIGS. 4-10 provide various operational examples in which new containers 118 are to be launched in container instances 114. The containers are referred to as "tenants" in these examples. In these examples, a tenant is already running in the potential target container instance for a new tenant and either or both of the existing and new tenants may have cotenant policies that need to be evaluated. The scheduler 128 evaluates the applicable cotenant policies and decides if the new tenant can be placed in the container instance 114, or in the same cluster 116 of container instances. In other embodiments, the decision about container placement is whether the new container can be placed on the same physical server as an existing tenant or on the same virtual machine instance as the existing tenant. The principles are the same regardless of which level—container instance, container instance cluster, virtual machine instance, or physical server—the cotenant policies are to be applied. The examples below describe deciding whether to place the tenant on a particular container instance, but this disclosure is not so-limited.

Figure 4:
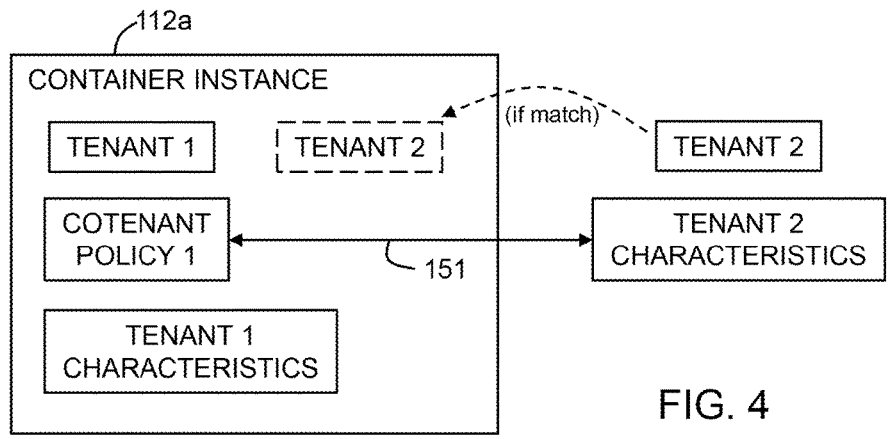
FIG. 4 shows an example of determining whether to place a new tenant on a container instance with an existing tenant based on the co-tenant policy specified by the existing tenant in accordance with an embodiment.

FIG. 4 shows an example of a container instance 114A which currently is running a container (designated as Tenant 1). Tenant 1 has characteristics designated as Tenant 1 Characteristics. Such characteristics include any one or more of the elements listed above in Table I (e.g., account identifier, type of container image, security level, etc.). Tenant 1 Characteristics include characteristics of Tenant 1 such as the image used to create Tenant 1, the security level of Tenant 1, and so forth (e.g., at least some of the characteristics listed in Table I, or additional or different characteristics). Some of the characteristics may have been included in the task definition file that was used to create Tenant 1, while other characteristics for Tenant 1 may have been obtained from the customer 102 configuring Tenant 1 pre or post-creation and stored in a data store included in, or accessible to, the container service 108.

The customer that had the service provider create Tenant 1 also specified a cotenant policy corresponding to Tenant 1. That policy may have been specified as part of a task definition file 104 for the container. The cotenant policy is designated as Cotenant Policy 1. Cotenant Policy 1 provides restrictions on which other tenants can be launched in the same container physical server, same virtual machine instance, and/or same container instance 114a as Tenant 1. Cotenant Policy 1 may be stored in database 136 along with, as noted above, the Tenant 1 Characteristics. Additionally or alternatively, Cotenant Policy 1 and Tenant 1 Characteristics may be stored in the container and may be accessible by the container agent 140 for the container instance that hosts the container. In either case, Tenant 1 Characteristics and Cotenant Policy 1 are accessible to the scheduler 128. The scheduler 128 may receive the Cotenant Policy 1 and Tenant 1 Characteristics from the agent 140 upon request or from the database 136 by way of the container manager backend service 134. A new container (Tenant 2) is to be created in a container instance. Tenant 2 has characteristics (such as those listed above) designated as Tenant 2 Characteristics. In the example of FIG. 4, the customer requesting Tenant 2 to be created has not specified a cotenant policy for Tenant 2.

The scheduler 128 receives the request for the creation of Tenant 2 and its characteristics and selects a container instance in which to potentially have Tenant 2 launched. The scheduler 128 may determine that container instance 114A is a candidate for running Tenant 2 (e.g., container instance 114A is configured to host the same type of container as is suitable for Tenant 2). The scheduler also considers Cotenant Policy 1 associated with Tenant 1. For example, the scheduler 128 compares Tenant 2 Characteristics to Cotenant Policy 1 (as indicated by arrow 151) to determine if placing Tenant 2 on container instance 114A would comply with or violate Cotenant Policy 1. For example, if Cotenant Policy 1 requires cotenants to run a particular type of container and to require multifactor authentication for access to such cotenants, then the scheduler 128 determines whether Tenant 2 Characteristics include such requirements. If Tenant 2 Characteristics have the requirements specified by Cotenant Policy 1, then the scheduler 128 determines that launching Tenant 2 in container instance 114A will not result in a violation of Cotenant Policy 1. However, if Tenant 2 Characteristics do not have all of the requirements specified by Cotenant Policy 1, then the scheduler 128 determines that launching Tenant 2 in container 114A will result in a violation of Cotenant Policy 1. If the scheduler 128 determines that Cotenant Policy 1 will be not be violated, then the scheduler 128 causes Tenant 2 to be created and hosted in container instance 114A. Otherwise, the scheduler 128 will not permit Tenant 2 to be launched in scheduler 128 out of respect for Tenant 1's cotenant policy, and instead will consider another container instance for launching Tenant 2.

Figure 5:
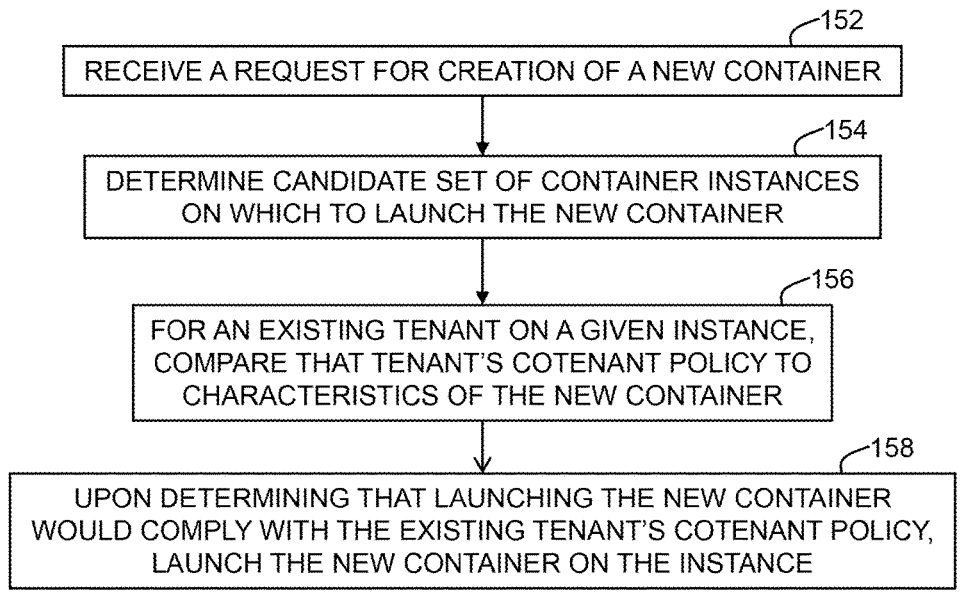
FIG. 5 shows a method corresponding to the example of FIG. 4 for determining whether to place the new tenant on the same container instance as an existing tenant in accordance with an embodiment.

FIG. 5 shows a method that corresponds to the example of FIG. 4. The operations shown in FIG. 5 can be performed in the order shown, or in a different order, and two or more of the operations may be performed concurrently rather than sequentially. At 152, the method includes receiving a request for creation of a new software container. The request may be originated by a customer through interaction with front-end service 124, and provided to a container manager backend service 134. The request may be, or at least include, a task definition file that specifies the container(s) to be created. In some embodiments, the task definition file may be created directly by the customer 102 and supplied to the front-end service 124. In other embodiments, the task definition file is generated by the container service 108 (e.g., by the front-end service 124 or the container manager backend service 134) as a result of options selected by the customer through a user interface. The task definition file may specify the location of one or more images used to create one or more containers as well as any cotenant policies desired by the customer to control cotenancy in the container instances in which the customer's containers are launched. The new container creation request (e.g., the task definition file) may be stored in database 136 or another data store of the service provider.

At 154, the method includes determining a candidate set of container instances in which to launch the container requested by the customer 102. In some embodiments, scheduler 128 performs the operation. For example, the scheduler 128 may issue an application programming interface call to the various container agents 140 to return information about their respective clusters 116, the cluster instances 114 within each cluster, and the containers 118 within each container instance. The information returned to the scheduler 128 by the container agents 140 may include the number and identifiers of container instances 114 within the cluster, resources available within the cluster, resources being used in the cluster, running tasks, etc. Such information additionally or alternatively may be retrieved from database 136. The information may also include any cotenant policies of containers already running. Launching a new container in a container instance in which an existing container is already running is only possible if doing so would not violate the existing container's cotenant policy. The scheduler 128 determines which container instances 114 are potentially suitable for launching the container taking into account the resources available in the various container instances in relation to the resource requirements specified for the new container in the task definition file.

Once the candidate set of container instances 114 is determined by the scheduler 128 the method includes, for existing tenant(s) on a given container instance 114 among the candidate set of container instances, comparing (156) that tenant's cotenant policy to the characteristics of the new container to be launched. The characteristics of the new container may be specified in the task definition file. Examples of the container's characteristics include any of those characteristics listed in Table I above, or different or additional characteristics. FIG. 4 shows an example of this operation in which Cotenant Policy 1 is compared to Tenant 2 Characteristics. This operation may be performed by the scheduler 128 accessing database 136 (possibly through interaction with the container manager backend service 134) to retrieve the cotenant policy 138 of the existing tenant. Alternatively, the cotenant policy of the existing tenant may be provided to the scheduler 128 by the container agent 140 through the agent communication service 142. The scheduler 128 compares the cotenant requirements in the cotenant policy of the existing container (Tenant 1) to the corresponding characteristics of the new container instance (Tenant 2). For example, if a cotenant requirement in the cotenant policy is that a new container must run version of an operating system and must have a certain customer account identifier, then the placement service 120 determines whether the new container to be created (Tenant 2) has the required operating system version and the account identifier.

Upon determining that launching the new container would result in compliance with the existing cotenant policy, then at 158 the scheduler 128 causes the new container 118 to be launched (i.e., created) in the container instance 114A in accordance with the task definition file and as a cotenant with the existing tenant. In some embodiments, the launching of the container may be performed at the request of the scheduler 128 but by the container agents running in the target container instance 114.

Figure 6:
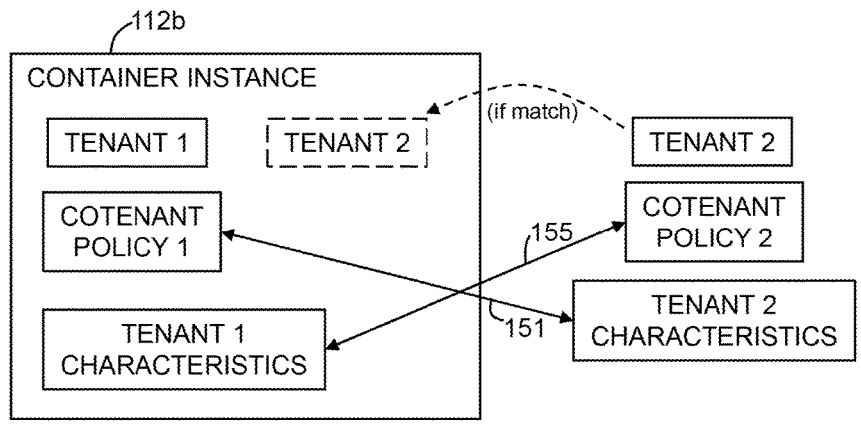
FIG. 6 shows another example of determining whether to place a new tenant in a container instance with an existing tenant based on the co-tenant policies specified by the existing tenant and the new tenant in accordance with an embodiment.

FIG. 6 shows an example in which a contain instance 114B includes Tenant 1, along with Cotenant Policy 1 and Tenant 1 Characteristics as noted above. A request has been made to launch a new container, Tenant 2. Tenant 2 has its own cotenant policy and characteristics designated as Cotenant Policy 2 and Tenant 2 Characteristics, respectively. Whereas in FIG. 4, the only concern was compliance with the existing tenant's cotenant policy, in FIG. 6, the scheduler compares the existing tenant's cotenant policy to the characteristics of the new tenant, and also compares the new tenant's cotenant policy to the characteristics of the existing tenant, as indicated by arrows 153 and 155. The scheduler will not cause the container (Tenant 2) to be launched in container instance 114B unless both cotenant policies are determined to be in compliance. That is, the scheduler determines whether launching Tenant 2 in container instance 114B will comply with the existing tenant's co-tenant policy (Cotenant Policy 1) and also whether the new tenant's co-tenant policy (Cotenant Policy 2) will be in compliance. If both co-tenant policies will be in compliance, then Tenant 2 can be launched in container instance 114B. Otherwise, if either or both co-tenant policies will not be in compliance, then the scheduler 128 will not permit Tenant 2 to be launched in container instance 114B.

Figure 7:
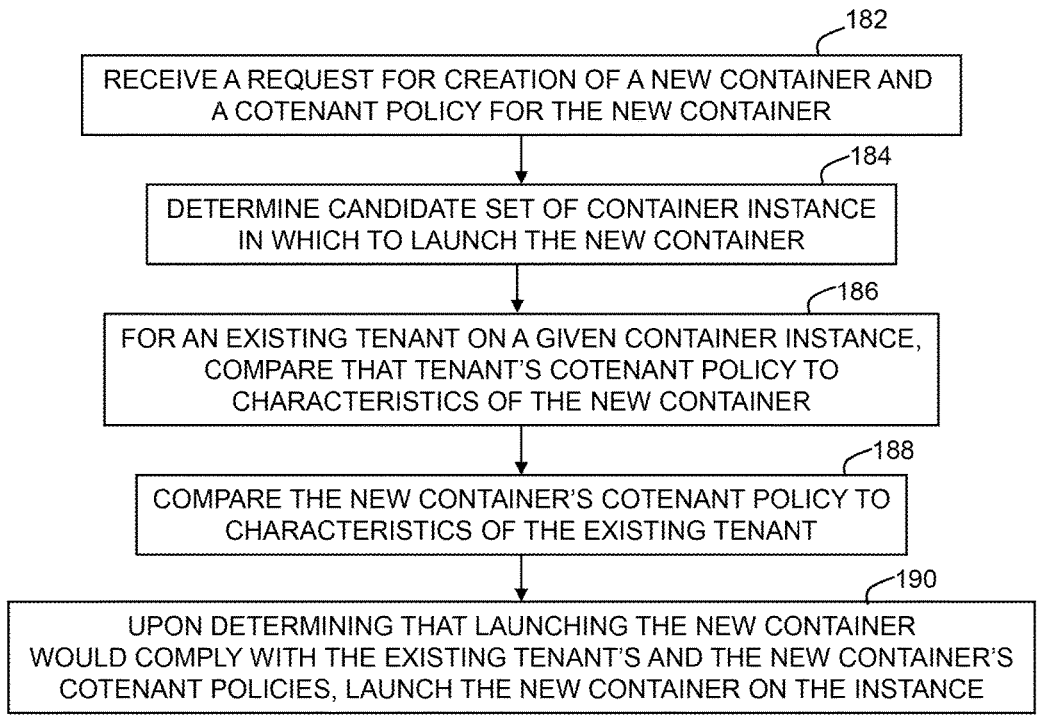
FIG. 7 shows a method corresponding to the example of FIG. 6 for determining whether to place the new tenant in the same container instance as an existing tenant based on both tenants' cotenant policies in accordance with an embodiment.

FIG. 7 shows a method that corresponds to the example of FIG. 6. The operations shown in FIG. 7 can be performed in the order shown, or in a different order, and two or more of the operations may be performed concurrently rather than sequentially. At 182, the method includes receiving a request for creation of a container 118 along with a cotenant policy associated with the container. As explained above with respect to FIG. 5, the request may be originated by a customer through interaction with front-end service 124 resulting in a task definition file that includes the request and a cotenant policy as explained previously.

At 184, the method includes determining a candidate set of container instances 114 in which to launch the container. This operation may be performed by the scheduler in the same or similar manner as that described above and generally includes determining which container instances are suitable to host the container (e.g., in regards to needed resources, available resources, etc.)—without consideration at this point of the cotenant policy of the new container.

Once the candidate set of container instances 114 is determined by the scheduler 128 the method includes, for an existing tenant in a given container instance among the candidate set, comparing (186) that existing tenant's cotenant policy to the characteristics of the new container. FIG. 6 shows an example of this operation in which Cotenant Policy 1 is compared to Tenant 2 Characteristics. This operation may be performed by the scheduler 128 accessing the cotenant policies 138 in database 136 to retrieve the cotenant policy of the existing tenant and comparing the cotenant requirements in that tenant's cotenant policy to the corresponding characteristics of the new tenant.

At 188, the method also includes comparing the new container's cotenant policy to characteristics of the existing tenant. In the example of FIG. 6, Cotenant Policy 2 is compared by the scheduler 128 to Tenant 1 Characteristics. This comparison is much the same as that described above—for example, determining whether the tenant requirements encoded into the container's cotenant policy are satisfied by the characteristics of the existing tenant in container instance 114B.

Upon determining that launching the new container (Tenant 2) would result in compliance with the existing tenant's cotenant policy and with the new container's cotenant policy, then at 190 the scheduler 128 causes Tenant 2 to be launched in the container instance 114B as a cotenant with the existing tenant (e.g., launches the new container itself or requests another service such as the container agent 140 to do so).

Figure 8:
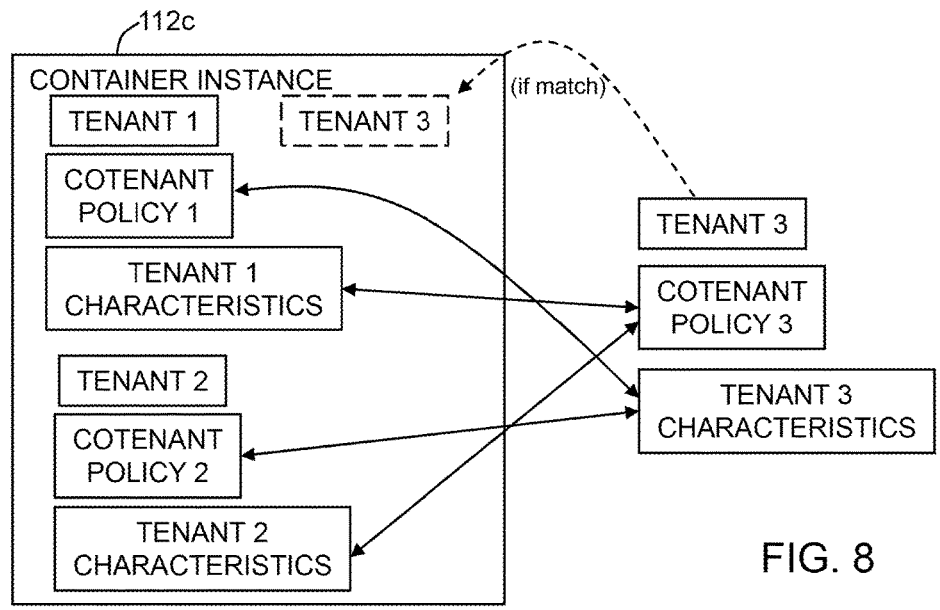
FIG. 8 shows another example of determining whether to place a new tenant in a container instance with multiple existing tenants based on the co-tenant policies specified by the existing tenants and the new tenant in accordance with an embodiment.

The example of FIG. 8 is similar to that of FIG. 6. A new container (Tenant 3) is to be created and the new container has its own characteristics (Tenant 3 Characteristics) and cotenant policy (Cotenant Policy 3), for example, specified in a corresponding task definition file. Container instance 114C currently hosts two existing containers designated as Tenant 1 and Tenant 2. Each existing tenant has its own cotenant policy (Cotenant Policy 1 and Cotenant Policy 2) and each existing tenant has its own set of characteristics (Tenant 1 Characteristics and Tenant 1 Characteristics). In the example of FIG. 8 all three cotenant polices are evaluated by the placement scheduler 128 to determine whether the new container (Tenant 3) can be launched in container instance 114C. Cotenant Policy 3 of the new container is compared to the characteristics of each of the two existing tenants—Tenant 1 and Tenant 2, and each existing tenant's cotenant policy is compared to the characteristics of the new container (Tenant 3 Characteristics). The cotenant policy of each existing tenant need not be evaluated against the other existing tenant's characteristics because that comparison will already have been performed during the process of deciding whether to launch the latter of the two existing tenants in the container instance 114C in the first place.

Figure 9:
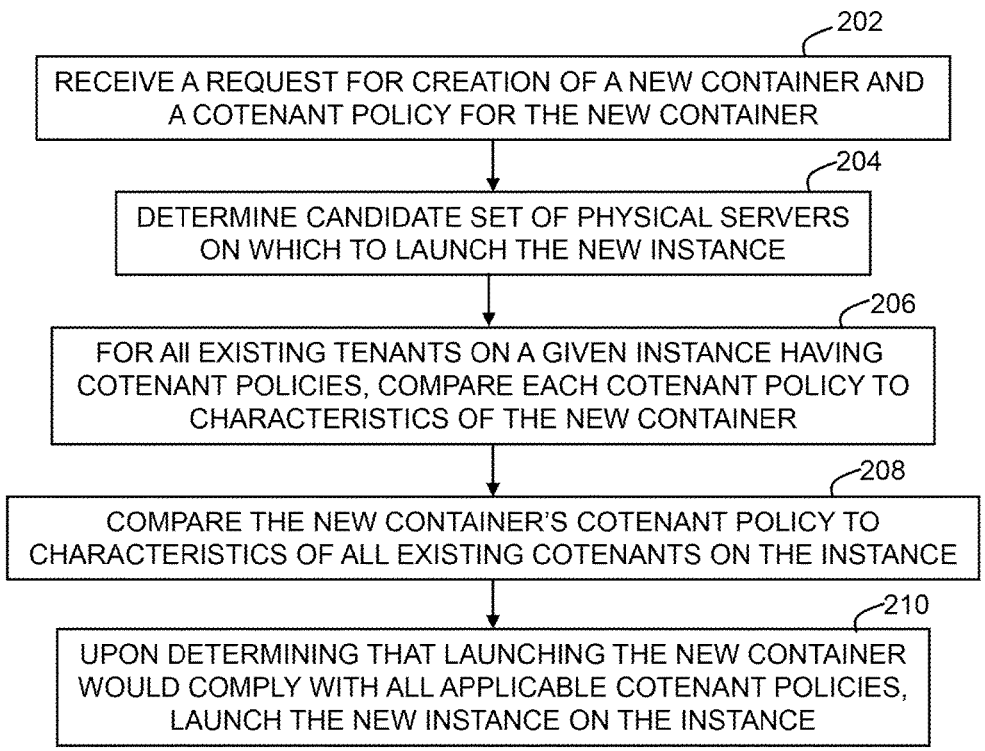
FIG. 9 shows a method corresponding to the example of FIG. 8 for determining whether to place the new tenant in the same container instance as multiple existing tenants in accordance with an embodiment.

FIG. 9 shows a method that corresponds to the example of FIG. 8. The operations shown in FIG. 9 can be performed in the order shown, or in a different order, and two or more of the operations may be performed concurrently rather than sequentially. At 202, the method includes receiving a request for creation of a new container 118 (e.g., Tenant 3) along with a cotenant policy associated with the new container to be created. As explained above, the request may be originated by a customer through interaction with front-end service 124. The cotenant policy and container creation request (e.g., task definition file) may be stored in database 136 and processed by scheduler 128.

At 204, the method includes determining a candidate set of container instances 114 in which to launch the new container. This operation may be performed by the scheduler 128 in the same or similar manner as that described above and generally includes determining which container instances 114 are suitable to host the new container—without consideration at this point of the cotenant policy of the new container.

Once the candidate set of container instances 114 is determined by the scheduler 128, the method includes, for all existing tenants on a given container instance 114 among the candidate set of container instances, comparing (206) the existing tenants' cotenant policies to the characteristics of the new container. FIG. 8 shows an example of this operation in which each of Cotenant Policies 1 and 2 is compared to the Tenant 3 Characteristics. This operation may be performed by scheduler 128 accessing the database 136 to retrieve the cotenant policies 138 of the existing tenants and comparing the cotenant requirements in those cotenant policies to the corresponding characteristics of the new container.

At 208, the method also includes comparing the new container's cotenant policy to characteristics of the existing tenants. In the example of FIG. 8, Cotenant Policy 3 is compared by the placement service 120 both to Tenant 1 Characteristics and Tenant 2 Characteristics. This comparison is much the same as that described above—for example, determining whether the tenant requirements encoded into the new container's cotenant policy are satisfied by the characteristics of the existing tenants on server 112c.

Upon determining that launching the new container would result in compliance with the existing tenants' cotenant policies and with the new tenants cotenant policy, then at 210 the scheduler 128 causes the new container to be launched in the container instance 114C as a cotenant with the existing tenants (e.g., launches the container itself or requests another service to do so).

Figure 10:
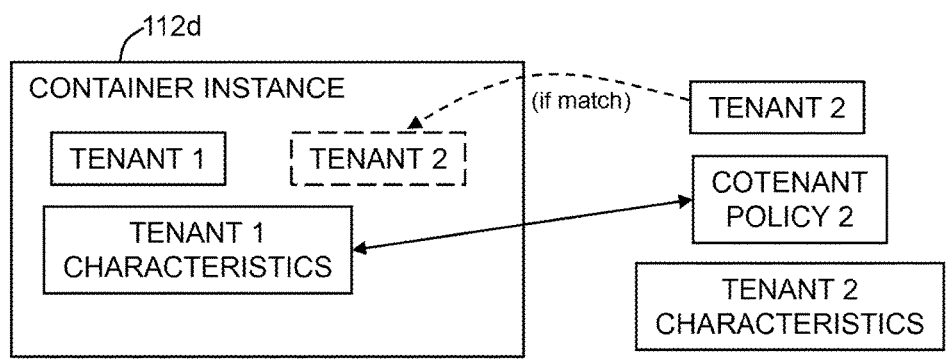
FIG. 10 shows another example of determining whether to place a new tenant in a container instance with an existing tenant based on the co-tenant policy of the new tenant in accordance with various implementations.

FIG. 10 shows an example of a container 114D currently hosting a container (Tenant 1) that does not have an associated cotenant policy. A new container (Tenant 2) is to be created and container instance 114D is a potential server in which to launch Tenant 2. The new tenant (Tenant 2) includes a cotenant policy (Cotenant Policy 2). The scheduler 128 determines whether launching Tenant 2 in container instance 114D will permit compliance with the Tenant 2's cotenant policy. If any of the characteristics of Tenant 1 (Tenant 1 Characteristics) violate Cotenant Policy 2 in any way, the scheduler 128 will not permit Tenant 2 to be launched in container instance 114D; otherwise container instance 114D is determined to be a suitable instance for launching Tenant 2.

In some embodiments, even upon confirming compliance with all applicable cotenant policies and launching a container 18 in a suitable container instance 114 (or cluster of container instances, virtual machine instance, or physical server), it is possible that modifications to the configuration and operation of a cotenant will result in a violation of a cotenant policy that previously was in compliance. For example, after a particular container has been launched in an instance, the owner of the instance may change the security settings for the container. The owner may have employed multifactor authentication initially, but subsequently decides to discontinue the use of multifactor authentication. Another tenant's cotenant policy, however, may require that all other tenants in the same container instance to employ multifactor authentication, and thus that policy will no longer be in compliance. Any one or more of multiple characteristics of a given tenant may be modified after launching and operating the tenant. When a characteristic of a cotenant being hosted on a server changes, the change is also reflected in the tenant's characteristics which may be stored in database 136 or determined by container agents 140. The scheduler 128 is able to periodically access the characteristics of each cotenant 118 in a container instance or be informed when a characteristics of container changes. Further still, an owner of a particular container may change the cotenant policy for that container after the container has already been launched in a container instance. The modified policy may not be in compliance following the change due to the other tenants already in the container instance.

For all tenants that have cotenant policies, the scheduler 128 re-evaluates the cotenant policies of all such cotenants. The cotenant policy re-evaluation may be performed periodically as a background process (e.g., once per hour, once per day, etc.), or on demand by, for example, a network administrator or the customers 102. If a particular cotenant policy is determined to no longer be in compliance due to a change in the characteristics of another cotenant in the same container instance or a change to the policy itself, the scheduler 128 may cause the cotenant that is causing the non-compliance or the instance whose cotenant policy is being violated to be migrated from the current container instance to another container instance. In some embodiments, the scheduler 128 itself performs the migration. In other embodiments, the scheduler 128 invokes a migration service to perform the desired migration. Migrating a container from a current container instance to a new instance may include ceasing its operation in the current container instance and instantiating the container in the new container instance. The migration process may include copying data and state information as well. In some embodiments, if an owner of a container attempts to change his or her cotenant policy, a check can be made at that time to determine if the change to the policy will result in the modified policy not being in compliance. If the policy will be violated, the owner can be informed that his or her container will need to be migrated to a new container instance due to the change in the policy. The owner can be presented with the option (e.g., a via user interface) to cancel the change to the policy or proceed with the change (which will cause that tenant to be migrated to another instance).

Figure 11:
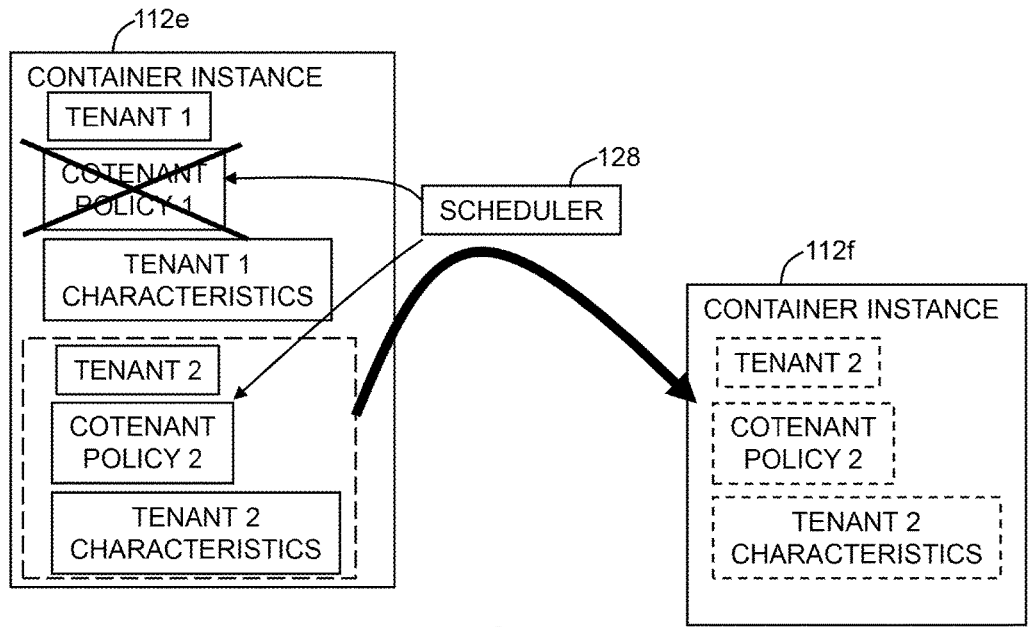
FIG. 11 illustrates a system in which an existing software container is migrated from one container instance to another upon detection that a cotenant policy is no longer in compliance in accordance with an embodiment.

FIG. 11 shows an example of a container instance 114E on which two tenants are currently hosted—Tenant 1 and Tenant 2. Each tenant has its own characteristics (Tenant 1 Characteristics and Tenant 2 Characteristics) and cotenant policy (Cotenant Policy 1 and Cotenant Policy 2). Compliance with both cotenant polices was ensured by scheduler 128 before the latter of the tenants was permitted to be launched in container instance 114E. Arrows 191 and 193 indicate that periodically the scheduler evaluates the cotenant polices of the tenants to ensure that each remains in compliance. The evaluation involves comparing each tenant's cotenant policy to the other cotenant's characteristics. Cotenant Policy 1 is compared to Tenant 2 Characteristics, and Cotenant Policy 2 is compared to Tenant 2 Characteristics. As indicated by the "X" through Cotenant Policy 1, in the example of FIG. 11, the scheduler 128 determines that Cotenant Policy 1 for Tenant 1 is no longer in compliance due to a change in the characteristics of Tenant 2. The cotenant policy of Tenant 2, however, is determined to remain in compliance. In some embodiments, the scheduler 128 responds by migrating the offending cotenant (i.e., the one whose characteristics changed to cause a violation of another tenant's cotenant policy) to a different container instance. As such Tenant 2 is migrated to container instance 114F. In other embodiments, the placement service 120 may cause the tenant whose cotenant policy is determined to be out of compliance to be migrated to another container instance. In this latter scenario, the Tenant 1 would be migrated to container instance 114F instead of Tenant 2.

Figure 12:
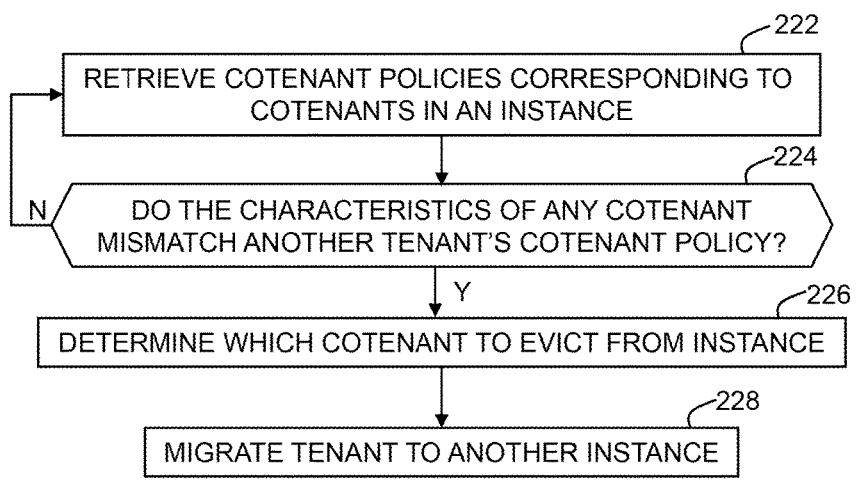
FIG. 12 illustrates a method of migrating a cotenant to another container instance based upon continued evaluation of the cotenant policies in accordance with an embodiment.

FIG. 12 shows a method that corresponds to the example of FIG. 11. The operations shown in FIG. 12 can be performed in the order shown, or in a different order, and two or more of the operations may be performed concurrently rather than sequentially. The method of FIG. 12 may be performed periodically or upon demand by any of the instance owners. At 222, the method includes retrieving the cotenant policies corresponding to each of the cotenants in a given container instance. The cotenant policies may be retrieved by the scheduler 128 from database 136, perhaps via container manager backend service 134.

At 224, the scheduler 128 determines whether the characteristics of any cotenant in a given container instance mismatch a cotenant policy of any of the other cotenants that have cotenant policies. If the scheduler determines there to be no mismatch, then control loops back to 222 for a subsequent evaluation of the cotenant policies. If, however, the scheduler 128 determines there to be a mismatch between characteristics of a cotenant and another cotenant's cotenant policy, then at 226, the scheduler determines which cotenant to evict from the container instance. As explained above, the cotenant whose change in characteristics resulted in the content policy violation may be evicted, or the cotenant whose cotenant policy is now being violated may be evicted.

At 228, the method includes migrating the cotenant to be evicted to another container instance 114. The scheduler 128 may determine a suitable target for the migration. In much the same way as the scheduler based its original decision as to which container instance 114 should host the tenant that is now earmarked for migration, the scheduler 128 compares that tenant's cotenant policy (if any) to characteristics of other tenants on other container instances 114 and compares the cotenant policies of existing tenants on the other instances to the characteristics of the tenant to be migrated (Tenant 2 in the example of FIG. 11).

Figure 13:
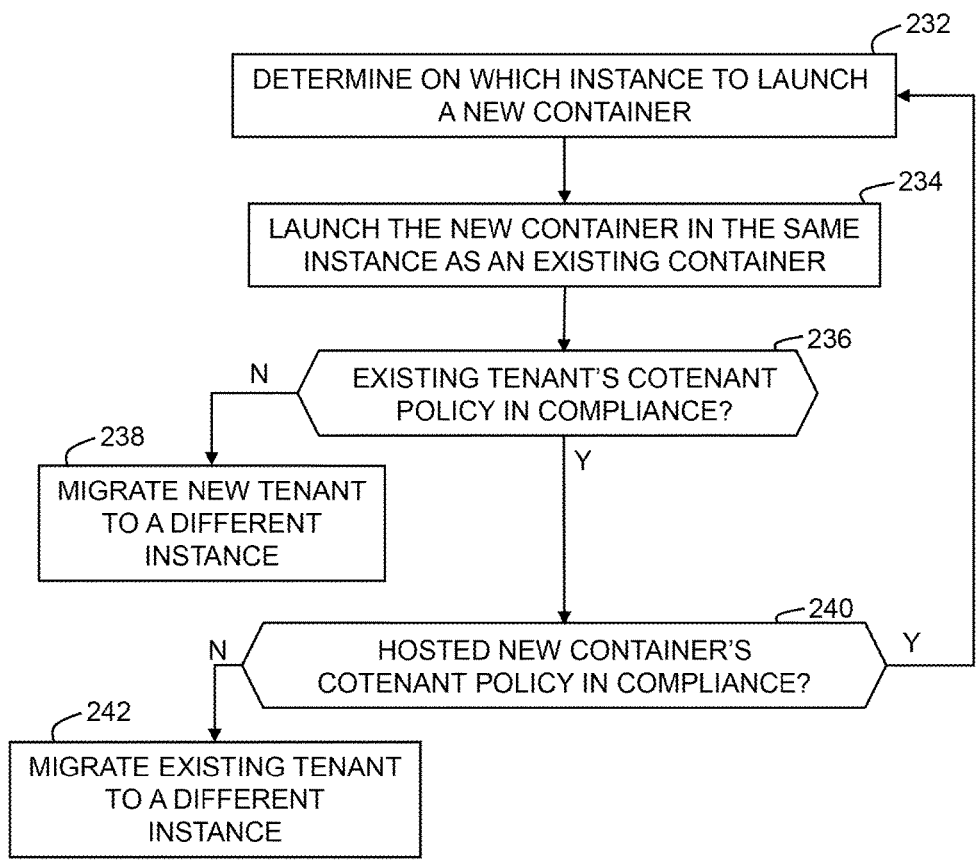
FIG. 13 illustrates a method for launching a new software container in a container instance based on cotenant polices and then determining whether to migrate one of the software containers to a separate container instance in accordance with an embodiment.

FIG. 13 shows another example of a method involving migration of an existing container upon a subsequent determination that a cotenant policy is currently being violated. At 232, the method includes determining on which container instance to launch a new container. As explained above, this determination may be based, at least in part, on a comparison of the new container's characteristics to an existing container's cotenant policy and a comparison of the existing container's characteristics to the new container's cotenant policy.

At 234, the method includes launching the new container on the same container instance that hosts the existing container. Launching the new container will occur on the container instance if all relevant cotenant policies are deemed to be in compliance. At 236, the scheduler 128 determines (periodically or otherwise) whether the existing container's cotenant policy is compliance. This operation is performed by retrieving the characteristics of the latter created container (the "new" container that has now been launched in the container instance), and comparing those characteristics to the existing tenant's cotenant policy. If a mismatch is detected, then at 238, the new container is migrated away (e.g., using scheduler 128) to a different container instance.

However, if the existing tenant's cotenant policy remains in compliance, then the scheduler 128 determines whether the new container (at this point already a cotenant on the container instance) is still in compliance. As above, the characteristics of the existing tenant are retrieved by the scheduler 128 from, for example, database 136 or from the corresponding container agent 140 and compared to the cotenant policy of the new tenant. If the characteristics of the existing tenant have changed since the last time the cotenant policy of the new tenant has been evaluated, the scheduler 128 will determine whether the changes are such that the new tenant's cotenant policy is no longer in compliance. If that is the case, then at 242, the existing tenant is migrated to a different container instance. Control otherwise loops back to 232 to repeat the process of FIG. 13.

In some embodiments, a customer can change an existing cotenant policy. For example, a customer may have created a container and assigned it a cotenant policy that was analyzed during the original container creation process as described herein. Later, the customer may decide to change the cotenant policy. For example, the customer may increase the security level requirement in the policy that the customer will tolerate in its cotenants. The changes may be made through the front-end service 124 (FIG. 2) and provided to the scheduler 128. The scheduler receives the changed cotenant policy and compares the new cotenant policy to the characteristics of the other cotenants in the same container instance. If the new cotenant policy is not in compliance, then the scheduler 128 causes a migration to occur as described above. In some embodiments, the scheduler 128 evaluates the new cotenant policy immediately upon receiving it, while in other embodiments, the scheduler stores the new cotenant policy in database 136 for subsequent evaluation per the methods of FIGS. 12 and 13.

In addition to, or instead of, a cotenant policy specifying individual requirements such as those listed above in Table I that must be complied with to permit cotenancy, a cotenant policy may specify a trust score threshold for a cotenancy requirement. A trust score can be computed for each existing tenant and all new containers pending their creation. The trust score for a given container generally reflects the trustworthiness of the container. The trust score may be a number that represents a weighted combination of a variety of factors, at least some of which include the requirements listed in Table I. A trust score may be a number that indicates relative trustworthiness on any desired scale such as 0 to 5, 0 to 10, or 0 to 100, with 5, 10 and 100 being the highest trust scores (greatest trustworthiness) in those ranges.

Figure 14:
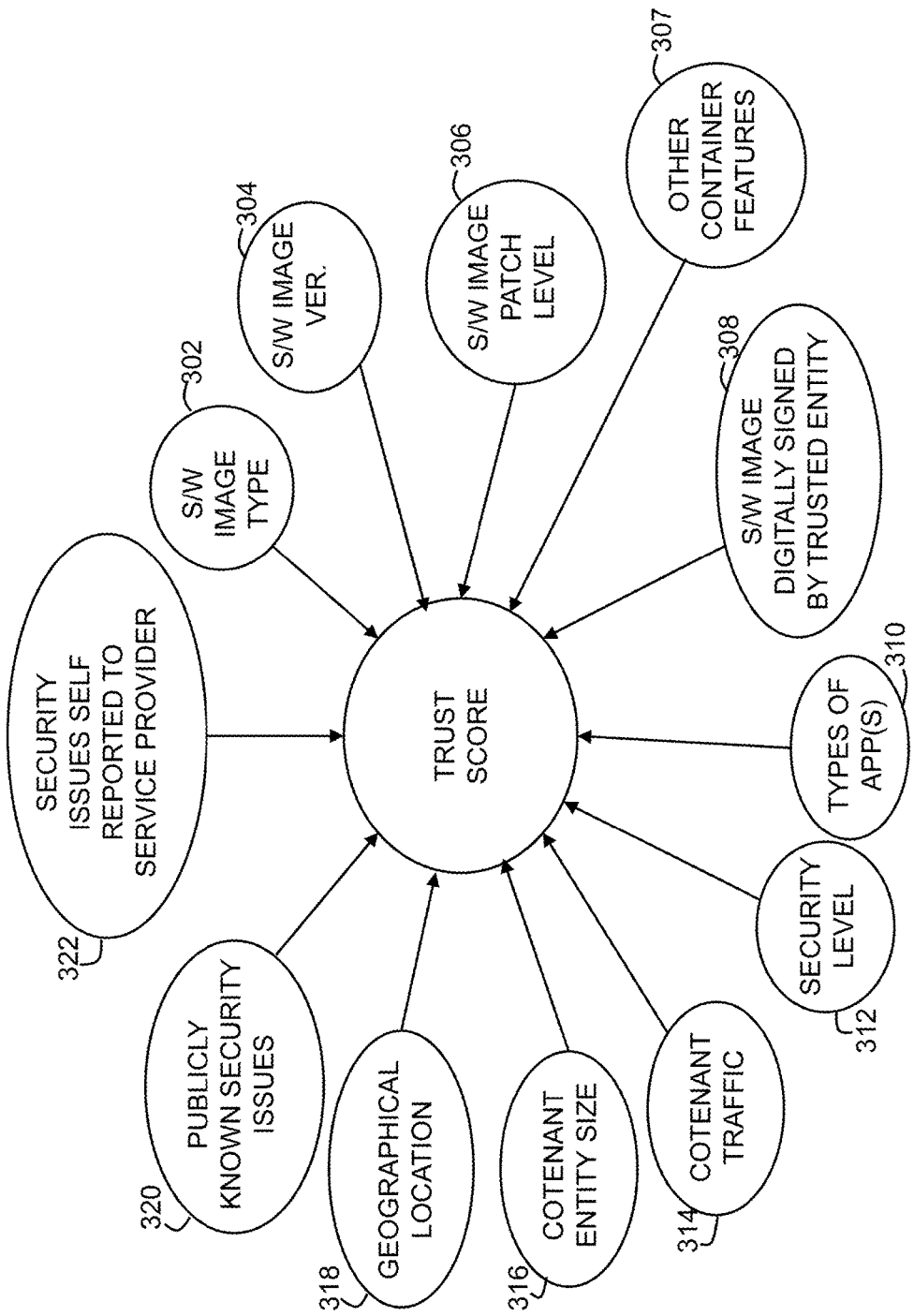
FIG. 14 illustrates examples of various factors that contribute to the computation of a trust score for a given software container in accordance with an embodiment.

FIG. 14 shows an example of the various factors that may contribute to the computation of a trust score. Some of the factors are specific to the container itself, while others relate to the entity (customer) that owns the container and the use of the container. For example, certain types of software images used to create containers may be deemed more trustworthy from a security and reliability standpoint than other images. Thus, one factor for computation of a trust score may be the software image type 302. Each software image type may be mapped apriori to a particular numerical score which then factors into the calculation of the trust score for a container that is created based on that image. Similarly, each of the software image version 304, software image patch level 306, other container features 307, whether a software image is digitally signed and by which particular trusted entity (308), types of applications 310, and security level 312 also may be reduced to a numerical input score for the calculation of the trust score. Individual applications may each be assigned a value in accordance with the level of trust determined apriori for each such application. An application that historically has had a large number of bugs and has caused problems for other software systems may be assigned a lower value than applications that have not had such problems or to the same degree. If a container is to run multiple applications, the assigned values for the various applications may be averaged together in a weighted or unweighted fashion as desired. The security level 312 may include a variety of factors such the type of authentication (e.g., single versus multifactor authentication), whether a firewall is used, whether and the type of antivirus software is used, etc. As for the application type factor 310, each security type may be assigned a value and such values may be averaged together (weighed or unweighted). Other container features 307 may include any of a variety of container-specific configuration elements such as whether the container has been enabled or disabled to access a network, whether input/output or disk accesses have been enabled or disabled, whether cryptographic features (e.g., use of a trusted platform module (TPM)) have been enabled or disabled, etc. Factors 302-312 are generally specific to the container itself.

Co-tenant traffic 314 factors into the trust score one or more elements related to the traffic such as how much traffic that co-tenant receives, the particular internet protocol (IP) addresses that are used, port numbers, etc. A container with a high level of traffic may be considered more trustworthy than a container with a low traffic level. A numerical value may be assigned based on threshold ranges of traffic size.

Cotenant entity size 316 factors into the trust score an element related to the size of the entity that owns the container. A large Fortune 500 corporation may be deemed more trustworthy than a small company, and thus a numerical value may be assigned based on size such as based on threshold ranges of size (e.g., number of employees, volume of annual revenue, etc.).

A numerical value may be assigned based on the geographical location 318 of the location of the entity (e.g., corporate office) that owns the container. Certain areas of the world may be less trustworthy than other areas in terms of corporate espionage, hacking, etc. and the numerical value for the geographical location 318 may reflect that issue.

Security problems pertaining to a container may factor into the trust score as well. Any publically known security issues 320 may be identified by based on on-line or other reports, and the container owner entity itself may self-report to the service provider security issues 322 its container has experienced. Numerical values may be assigned based on the severity of the identified security problems, the frequency of the security problems, etc.

These and other or different factors may result in the computation of a trust score for each container. At least one and, in some embodiments, at least two of the factors are used to compute the trust score. If the trust scores are computed on a range of, for example, 0 to 100, a customer may specify in its cotenant policy that cotenancy requires a trust score for a potential cotenant of at least 80. That is, all cotenants in a container instance, in which one of the cotenant polices requires a trust score of 80, must have a computed trust score of 80 or higher. A new container to be placed on a container instance cannot be launched in that particular instance if the trust score for the new container is less than 80.

Figure 15:
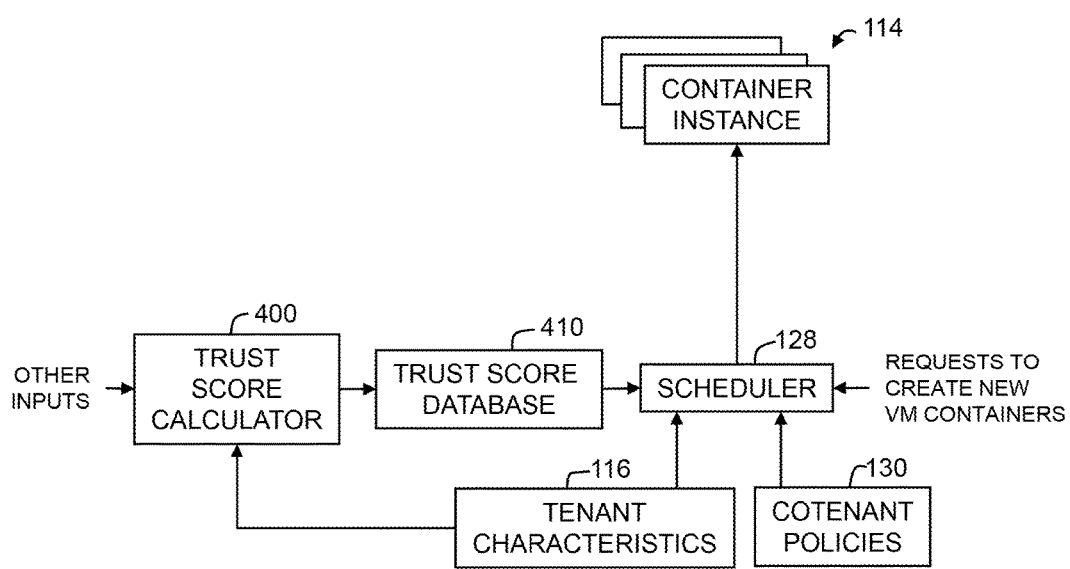
FIG. 15 shows a system diagram that includes a trust score calculator and a scheduler that places the containers based on the trust score in accordance with an embodiment.

FIG. 15 shows an example of a system which includes a trust score calculator 400 for calculating the trust scores explained above. The system includes container instances 114, the scheduler 128, tenant characteristics 116, cotenant policies 138, the trust score calculator 400, and a trust score database 410. As previously described, the scheduler 128 receives a request to create a new container and accesses tenant characteristics 116 and cotenant policies 138 (e.g., from database 136 and/or from container agents 140) for any existing tenants already being launched in a container instance 114 which is an acceptable candidate for hosting the new container. The scheduler 128 evaluates the applicable cotenant policies (e.g., of the new container and/or the existing tenants) causes the new container to be launched on the designated container instance 114.

The trust score calculator 400, which may comprise a processor, memory and other hardware resources executing a trust score calculator software program, access the tenant characteristics of the tenants launched in the container instances and computes a trust score for each such tenant. The trust score for each tenant may be computed during the process of deciding in which instance to originally launch the new tenant, or at a later point in time. Characteristics of a tenant may be changed from time to time and thus the trust score for the tenant can be updated periodically by the trust score calculator 400.

The trust score for each tenant is stored by the trust score calculator 400 in the trust score database 410. When the scheduler 128 operates to decide in which container instance to launch a new container, to the extent any applicable cotenant policy specifies a trust score, the scheduler accesses the trust score database 410 to retrieve the corresponding trust score. In other embodiments, the scheduler 128 may send a request to the trust score calculator 400 to provide a trust score for a particular tenant and the trust score calculator 400 accesses the trust score database 410 to retrieve the requested trust score and return it to the scheduler 128. The scheduler then uses the trust scores as explained above when deciding in which instance to launch a new tenant and/or whether all applicable cotenant polices remain in compliance. For example, a cotenant may experience a drop in its trust score due to a change in the characteristics of that cotenant. The newly computed trust score for that tenant may drop below a threshold trust score of another tenant's cotenant policy resulting in a violation of that cotenant policy, and possible migration of the offending cotenant.

Figure 16:
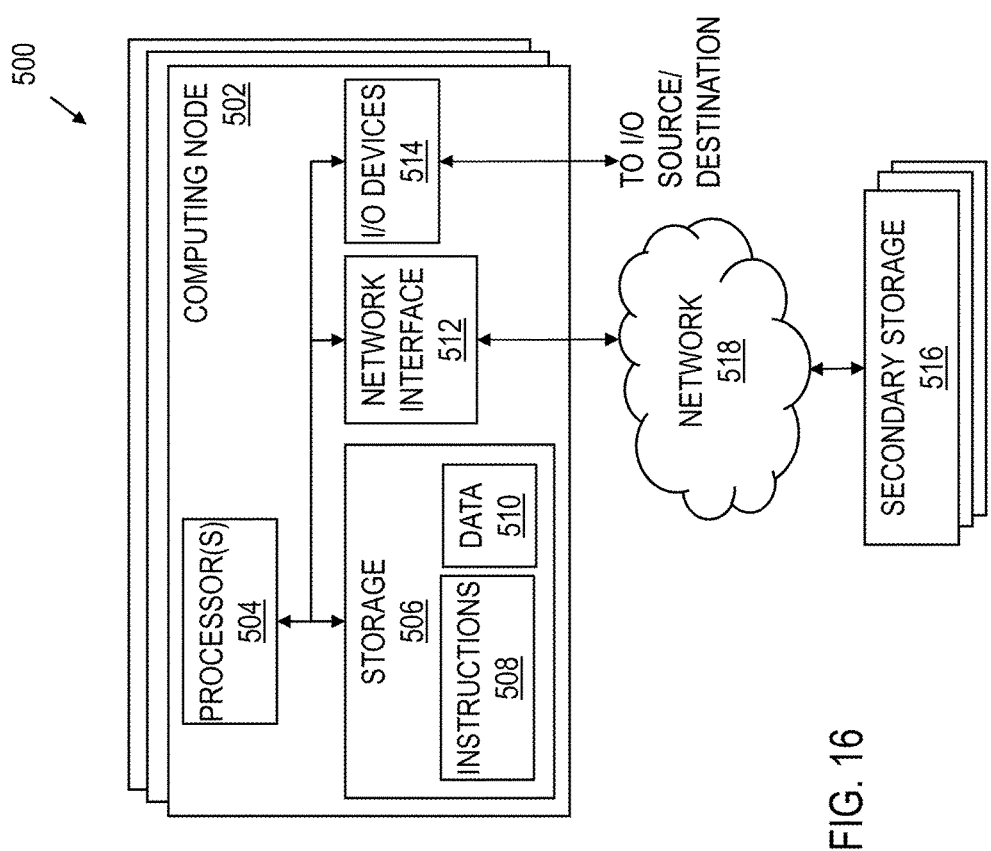
FIG. 16 is a block diagram of computing nodes in accordance with an embodiment.

FIG. 16 shows a schematic diagram for a computing system 500 suitable for implementation of the web services platform 102, including the functionality to create and use cotenant policies and trust scores as described herein in accordance with various embodiments. The system includes one or more computing nodes 502. The computing system 500 includes the computing nodes 502 and secondary storage 516 communicatively coupled together via a network 518. One or more of the computing nodes 502 and associated secondary storage 516 may be used to provide the functionality of the template service 126, scheduler 128, front-end service 124, container manager backend service 134, container agents 140, agent communication services 142 the trust score calculator 400, and the instance manager 405.

Each computing node 502 includes one or more processors 504 coupled to memory 506, network interface 512, and I/O devices 514. In some embodiments, a computing node 502 may implement the functionality of more than one component of the system 100. In various embodiments, a computing node 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the web services platform 102, each of the computing nodes 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement template service 126, scheduler 128, front-end service 124, container manager backend service 134, container agents 140, agent communication services 142 the trust score calculator 400, and the instance manager 405, and/or other components of the service provider's network disclosed herein.

Secondary storage 516 may include additional volatile or non-volatile storage and storage devices for storing information such as program instructions and/or data as described herein tier implementing the various aspects of the service provider's network described herein. The secondary storage 516 may include various types of computer-readable media accessible by the computing nodes 502 via network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing node 502 for execution by a processor 504 by transmission tried a signals via the network 518, which may be a wired or wireless network or a combination thereof. Each of the template service 126, scheduler 128, front-end service 124, container manager backend service 134, container agents 140, agent communication services 142 the trust score calculator 400, and the instance manager 405 may be implemented as a separate computing node 502 executing software to provide the computing node with the functionality described herein. In some embodiments, two or more of the template service 126, scheduler 128, front-end service 124, container manager backend service 134, container agents 140, agent communication services 142 the trust score calculator 400, and the instance manager 405 may be implemented by the same computing node.

The network interface 512 may be configured to allow data to be exchanged between computing nodes 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing nodes 502. Multiple input/output devices 514 may be present in a computing node 502 or may be distributed on various computing nodes 502 of the system 500. In some embodiments, similar input/output devices may be separate from computing node 502 and may interact with one or more computing nodes 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internee appliances, PDAs, wireless phones, pagers, etc. Computing node 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

What is claimed is:

1. A non-transitory computer-readable storage device storing instructions that, when executed on a computing system, cause the computing system to:
   determine that characteristics of a new software container match a cotenant policy of an existing software container on a container instance, the cotenant policy of the existing software container created by an entity that created the existing software container;
   determine that characteristics of the existing software container match a cotenant policy of the new software container, the cotenant policy of the new software container created by an entity that created the new software container; and
   cause the new software container to be created on the container instance;
   wherein each software container comprises a program, data, and a system library and wherein each software container has its own namespace; and
   wherein each cotenant policy for a software container includes a restriction as to other software containers that can execute in the same container instance.

2. The non-transitory computer-readable storage device of claim 1 wherein the instructions, when executed, cause the computing system to determine that the characteristics of the new software container match a separate cotenant policy of each of a plurality of existing software containers on the container instance.

3. The non-transitory computer-readable storage device of claim 1 wherein each cotenant policy includes a cotenant requirement which specifies a characteristic of another software container candidate for creation on the container instance.

4. The non-transitory computer-readable storage device of claim 1 wherein at least one cotenant policy includes a trust score which other candidate software containers must meet in order to be created on the container instance.

5. A system, comprising:
   one or more processors; and
   storage containing instructions that, when executed, cause the one or more processors to:
      compare characteristics of a software container to a cotenant policy that includes a restriction as to characteristics of software containers that can run in a container instance;
      determine whether launching a software container in the container instance would violate the cotenant policy; and
      for no violation of the cotenant policy, cause the software container to be launched in the container instance;
   wherein each cotenant policy for a software container includes a restriction as to other software containers that can execute in the same container instance; and
   wherein each software container comprises a program, data, and a system library and wherein each software container has its own namespace.

6. The system of claim 5 wherein the instructions, when executed, cause the one or more processors to receive a request to create a new software container, and wherein the cotenant policy is a cotenant policy of the new software container, and wherein the software container characteristics include characteristics of a software container that is already running in the container instance.

7. The system of claim 5 wherein the instructions, when executed, cause the one or more processors to receive a request to create a new software container, and wherein the software container characteristics include characteristics of the new software container, and wherein the cotenant policy is a cotenant policy for a software container that is already running in the container instance.

8. The system of claim 5 wherein the instructions, when executed, cause the one or more processors to:
   while the container instance runs the software container, compare the cotenant policy to the software container characteristics;
   reassess whether continued running of the software container in the container instance violates the cotenant policy; and
   for a cotenant policy violation, migrate the software container to another container instance.

9. The system of claim 5 wherein the instructions, when executed, cause the one or more processors to:
   receive a request to create the software container; and
   select the container instance on which to launch the software container based on no violation of the cotenant policy and based on a software container image type included in the request.

10. The system of claim 5 wherein the restriction in the cotenant policy includes at least one of:
    a software container image type;
    a security type;
    cotenant traffic; and
    a geographical location.

11. The system of claim 5 wherein the instructions, when executed, cause the one or more processors to:
    compute a separate trust score for each of a plurality of software containers, each trust score computed based on a plurality of features of the corresponding software container, and
    select the container instance in which to launch the software container based on no violation of the cotenant policy, wherein the cotenant policy specifies a threshold trust score.

12. The system of claim 11 wherein the instructions, when executed, cause the one or more processors to:
    receive a change to an existing cotenant policy to produce a changed cotenant policy;
    determine whether the changed cotenant policy is in violation; and
    migrate a software container from the container instance to a different container instance.

13. The system of claim 5 wherein the instructions, when executed, cause the one or more processors to:
    determine whether launching the software container would violate a security parameter despite the cotenant policy; and
    for no violation of the cotenant policy but a positive determination that the software container would violate the security parameter, launching the software container in its own container instance.

14. A computer-implemented method, comprising:
    receiving a request for creation of a new software container;
    determining a candidate set of container instances on which to launch the new software container;
    for an existing software container already running in a container instance, comparing a cotenant policy of the existing software container to characteristics of the new software container, the cotenant policy of the existing software container created by an entity that created the existing software container; and
    upon determining that launching the new software container complies with the existing software container's cotenant policy, launching the new software container in the same container instance in which the existing software container is running;

wherein each cotenant policy for a software container includes a restriction as to other software containers that can execute in the same container instance; and wherein each software container comprises a program, data, and a system library and wherein each software container has its own namespace.

15. The method of claim 14 further comprising comparing a cotenant policy of the new software container to characteristics of the existing software container.

16. The method of claim 15 further wherein launching the new software container comprises launching the new software container in the same container instance in which the existing software container is running upon determining that launching the new software container complies both with the cotenant policy of the new software container and the cotenant policy of the existing software container.

17. The method of claim 14 further comprising:
computing a trust score for the new software container before it is launched in the same container instance that hosts the existing software container;
wherein the cotenant policy includes a trust score threshold, and
wherein determining that launching the new software container complies with the existing software container's cotenant policy includes determining whether the trust score for the new software container exceeds the trust score threshold in the cotenant policy.

18. The method of claim 17 wherein computing the trust score includes computing a trust score based on at least two of: software container image type, cotenant traffic, a software container instance entity size, a geographical location, security issues experienced by a software container, and a security level.

19. The method of claim 14 further comprising:
after launching the new software container in the same container instance, comparing the existing software container's cotenant policy to characteristics of the launched new software container;
determining that the characteristics of the launched new software container do not comply with the existing software container's cotenant policy; and
migrating the launched new software container to a different container instance.

20. The method of claim 14 wherein comparing the cotenant policy to the characteristics includes comparing a requirement for cotenancy to a characteristic of the new software container that defines a resource of the software container, the resource including at least one of a software container image type, a security level, and a traffic rate.

21. The method of claim 14 further comprising receiving a request to change a cotenant policy for a software container already running in the container instance, determining whether the changed cotenant policy is in violation, and migrating a software container to a separate container instance.

* * * * *